United States Patent [19]

Hoffacker et al.

[11] Patent Number: 5,098,492
[45] Date of Patent: Mar. 24, 1992

[54] METHOD FOR MAKING FILM CASSETTES

[75] Inventors: Franz Hoffacker, Langenfeld; Otto Wiedemann, Starnberg; Artur Klotz, Leverkusen, all of Fed. Rep. of Germany

[73] Assignee: Agfa Gevaert Aktiengesellschaft, Leverkusen, Fed. Rep. of Germany

[21] Appl. No.: 568,481

[22] Filed: Aug. 16, 1990

[30] Foreign Application Priority Data

Aug. 30, 1989 [DE] Fed. Rep. of Germany ....... 3928683

[51] Int. Cl.$^5$ .......................... B65B 7/00; B32B 31/00
[52] U.S. Cl. ....................................... 156/69; 156/196; 156/216; 156/275.1; 156/275.3; 156/290; 156/291; 156/324; 29/806
[58] Field of Search ............... 156/272.2, 275.1, 275.3, 156/69, 196, 290, 291, 216, 218, 324, 202; 29/806

[56] References Cited

U.S. PATENT DOCUMENTS

| | | | |
|---|---|---|---|
| 2,114,353 | 4/1938 | Powell | 156/216 X |
| 3,261,237 | 7/1966 | Sentiff | 29/806 |
| 4,106,420 | 8/1978 | Takahashi et al. | 156/203 X |
| 4,614,019 | 9/1986 | Shimizu et al. | 29/806 X |
| 4,867,815 | 9/1989 | Hoffacker et al. | 156/218 X |
| 4,891,089 | 1/1990 | Takahashi et al. | 29/806 X |

Primary Examiner—David A. Simmons
Assistant Examiner—Chester T. Barry
Attorney, Agent, or Firm—Connolly and Hutz

[57] ABSTRACT

In an improved embodiment, film cassettes comprising a substantially cylindrical casing, a film mouth of an upper lip and lower lip extending over the width of the casing, a film spool and end caps, the upper lip and lower lip of the film mouth being provided with sealing strips, contain the sealing strips for the lower lip bonded to the metal in such a way that the edge zones of the sealing strip on the narrow sides and the edge zones of the sealing strip on the longitudinal side are completely bonded to the metal on the lower lip while the edge zone of the sealing strip on the longitudinal side is completely or partly bonded to the metal inside the cassette and all or part of the inner region of the surface of the sealing strip is not bonded to the metal, so that 10 to 60% of the total surface area of the sealing strip is not bonded to the metal strip.

2 Claims, 2 Drawing Sheets

METHOD FOR MAKING FILM CASSETTES

This invention relates to a method for making film cassettes comprising a substantially cylindrical casing, a film mouth of an upper lip and lower lip extending over the width of the casing, a film spool and end caps, the film mouth being provided with a sealing material, for example with a strip of velvet, on the upper lip and lower lip.

The cassettes according to the invention are intended in particular for microfilms.

Whereas the upper lip of the film mouth is formed simply by tangential termination of the last piece of the metal strip of the casing, the lower lip is formed by bending of the casing metal through more than 90° (see FIG. 1). The film cassettes are produced by bending of a corresponding flat piece of metal which may be bonded to the sealing strips before or after bending. The sealing strip for the upper lip and lower lip of a cassette has a rectangular shape substantially corresponding in length to the height of the cassette. The width, which may be different at the upper and lower lip, is at least so great that the sealing strip extends over the bend of more than 90° into the interior of the cassette. The surface of the sealing strip for the lower lip is divided into two edge zones on the narrow sides, one edge zone on the longitudinal side in the interior of the cassette and one edge zone at the longitudinal side on the lower lip. The edge zones enclose an inner region of the strip surface which makes up 10 to 60% of the total bonding surface of a sealing strip.

After bending, the film spool is introduced into the curved casing and the cassette is closed by application of the end caps. Because the already bent casing is difficult to bond to the velvet, it is best for economic reasons initially to bond the still flat metal strip to the velvet and then to bend it into the shape of the cylindrical casing with the upper lip and lower lip.

However, it has been found that this approach results in a certain percentage of faulty cassettes in which the velvet is torn or unacceptably deformed at the edge of the lower lip.

The problem addressed by the present invention is to provide the flat metal strip with the velvet in such a way that the velvet does not tear during bending, particularly at the sharp bend of the lower lip, and unacceptable deformation of the velvet is avoided.

This problem is solved in accordance with the claim 1. Further embodiments of the invention are covered by the subsidiary claims.

More particularly, the sealing strip is applied in such a way that a strip of metal, of which the width corresponds to the circumference of a ready-shaped casing for a cassette and of which the length is several times the width of the casing for a cassette, is initially introduced and then provided along the edges forming the film mouth with the sealing material which is delivered in the form of continuous ribbon-like sealing strips that are joined to the metal strip of the casing on passing through a bonding station.

According to the invention, the stamps with which the sealing strip is pressed on are designed in such a way that, for the metal strip of each cassette, only the edge of the sealing strip is pressed on, spot-like or strip-like regions optionally being pressed on in the middle part of the sealing strip surface. The other parts of the sealing material, which are not to be bonded to the metal surface, may be adhesive-free or may also be coated with adhesive. Preferably, the entire surface of one side of the sealing material contains adhesive.

After application, the sealing material is cut between the individual lengths of metal, the length of metal required for one cassette is cut from the strip of sheet metal and shaped into the cassette casing as described above.

The cap notches have already been punched out from the metal strips to be bonded, as shown in FIG. 2.

The invention enables film cassettes to be produced in largely automated steps. Despite the increase in output, the method according to the invention guarantees consistently high quality of production.

At the same time, the manufacture of cassettes by the method according to the invention is very inexpensive.

One example of embodiment of the invention is described in detail in the following with reference to the accompanying drawings, wherein.

Figure 1:
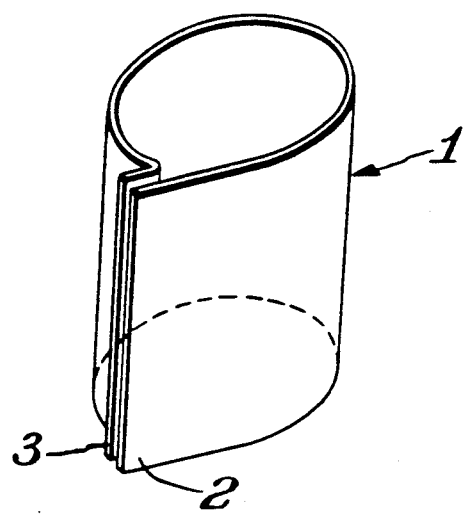
FIG. 1 shows a cassette casing (1) with an upper lip (2) and lower lip (3) which, according to the invention, is provided with sealing material at the opposite surfaces of the upper lip and lower lip. The cap notches are not shown in FIG. 1.

The metal strip 4 is drawn intermittently between the pressure block 5 and the heating block 6 and pressed against it by the pressure block 5.

The sealing strips 7, 8 hug the underneath of the metal strip 4 at its edges and, in doing so, pass through the groove-like recesses 9 of the pressure block 5. The sealing strips 7, 8 are delivered to the underneath of the metal strip 4 at its edges in such a way that they project slightly laterally beyond the edges of metal strip 4.

The sealing strips 7, 8, typically of velvet, are coated on the side facing the metal strip with a layer of a typical hot-sealing adhesive. For bonding, the heating block 6 is equipped with an electrical heating element known per se (not shown) which heats the edges of the metal strip 4 inductively from above. By contact with the heated edge of the metal strip 4, the hot-sealing adhesive is melted, so that the sealing strips 7, 8 are bonded to the underneath of the metal strip 4 and remain permanently bonded thereto, even after cooling.

Since the sealing strips 7, 8 are initially endless, they also span the marginal cap notches 10 on the underneath of the metal strip 4, as can clearly be seen.

In the interests of clarity, the guide rails 11, 12, the pressure block 5 and the heating block 6 are shown drawn apart from one another in relation to the metal strip 4. In reality, however, the metal strip 4 travels on the guide rails 11, 12.

The bonding station further comprises two storage magazines 13, 14 for the ribbon-like sealing strips 7, 8 which are run off in the form of "endless" ribbons from supply reels 15, 16 serving as storage packs and are delivered over fixed curved guides 17, 18 into the path of the metal strip 4 at its edges substantially tangentially from below.

After leaving the bonding station, the metal strip 4 travels in the direction of the arrow 19 over the guide rail 12 to the other processing stations (cutting of the sealing strips, separation of the individual sections from the metal strip, bending of the individual sections to form the cassette casing, insertion of the film spool, fitting of the end caps).

According to the invention, the sealing strip is applied by corresponding design of the pressure block 6.

FIGS. 3a to 3f show different possibilities for bonding the sealing strips to each individual metal section. The adhesive-coated region is denoted by the reference 20 and the adhesive-free region by the reference 21. Within the adhesive-free region, spot- or strip-form bonding 22 can be carried out. In the embodiments 3e and 3f, the adhesive-coated longitudinal side is bonded to the lower lip while the only partly adhesive-coated longitudinal side is bonded inside the cassette.

The special type of bonding is characteristic of the lower lip. The sealing material for the upper lip is preferably stuck on its entire bonding surface area.

Figure 2:
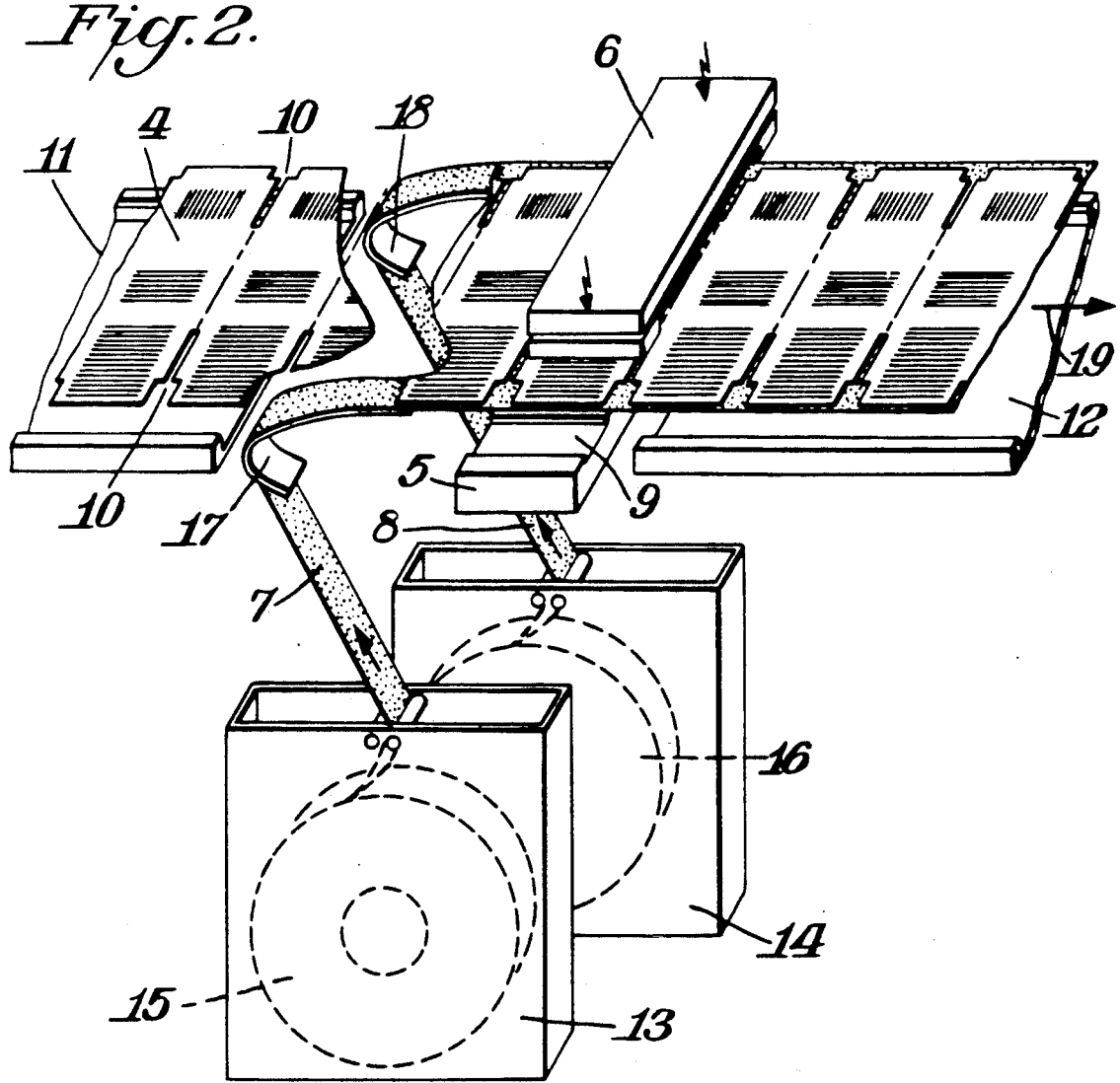
FIG. 2 shows a station for feeding and bonding the sealing strips.
Figure 3A:
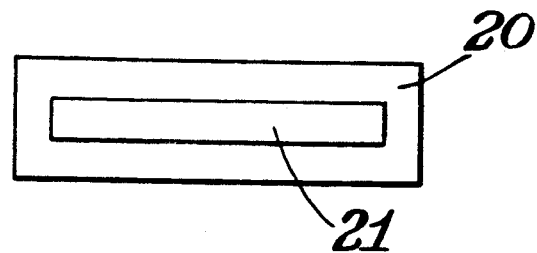
FIGS. 3a, 3b, 3c, 3d, 3e and 3f are plan views of sealing strips according to this invention illustrating embodiments of modifications of adhesive coatings on the strips for bonding the sealing strips to each individual metal section.
Figure 3B:
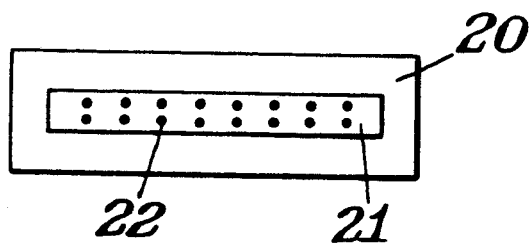
Figure 3C:
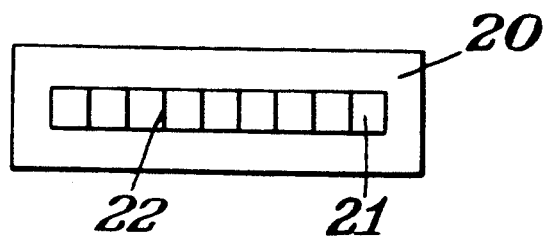
Figure 3D:
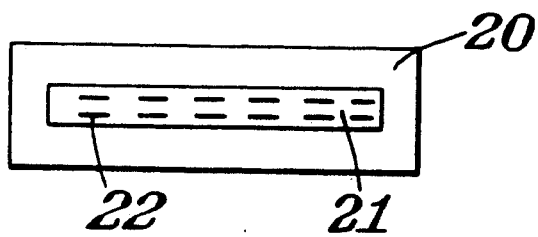
Figure 3E:
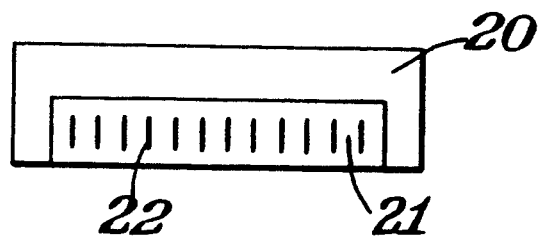
Figure 3F:
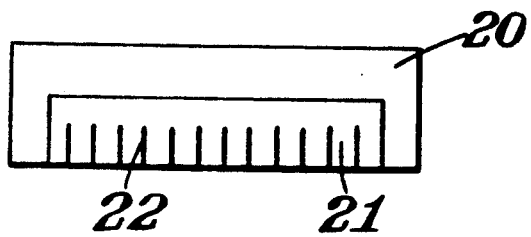

The end caps are axially symmetrical, flanged at their outer edges and, with the end edges of the cassette casing, form a force fit and a light-proof labyrinth seal when the caps are fitted onto the cassette casing. The axially symmetrical design of the caps is possible because the end edges of the final cassette casing are offset slightly in the region of the film mouth on account of the cap notches, the offset parts receiving the flanged edge of the caps in the region of the film mouth. Despite these offset parts, the cassette remains light-proof in this region because the sealing strips project beyond the offset parts, as can be seen from FIG. 2.

We claim:

1. A method of making a film cassette comprising the steps of:
    bonding a sealing strip having narrow sides and longitudinal sides onto an edge of a flat metal strip in such a way that the edge zones of the narrow sides of the sealing strip and the edge zone of one longitudinal side of the sealing strip are completely bonded to said edge of the metal strip, the edge zone of the sealing strip on the longitudinal side opposite said one longitudinal side is completely or partly bonded to the metal strip, and all or part of the inner region of the bonding surface of the sealing strip is not bonded to the metal, so that 10 to 60 % of the total surface area of the side of the sealing strip that is bonded to the metal strip is not bonded to the metal strip;
    bonding another sealing strip also having narrow sides and longitudinal sides onto another edge of the flat metal strip;
    bending said metal strip to form a substantially cylindrical casing, such that said edge forms a lower lip and said another edge forms an upper lip, said lips defining a film mouth opening extending over the width of the casing;
    introduction of a film spool into the casing; and
    application of end caps to the casing.

2. A method as claimed in claim 1, characterized in that said sealing strips are bonded to the metal by pressure application by corresponding stamps and inductive heating of the metal.

* * * * *